(12) United States Patent
Blaskovic et al.

(10) Patent No.: US 10,010,222 B2
(45) Date of Patent: Jul. 3, 2018

(54) FIRST RESPONDER DECONTAMINATION SYSTEM

(71) Applicants: Robert Blaskovic, Marietta, GA (US); Richard M. Rochford, Maryville, TN (US); Joe Hackney, Knoxville, TN (US)

(72) Inventors: Robert Blaskovic, Marietta, GA (US); Richard M. Rochford, Maryville, TN (US); Joe Hackney, Knoxville, TN (US)

(*) Notice: Subject to any disclaimer, the term of this patent is extended or adjusted under 35 U.S.C. 154(b) by 0 days.

(21) Appl. No.: 15/372,064

(22) Filed: Dec. 7, 2016

(65) Prior Publication Data
US 2017/0156548 A1 Jun. 8, 2017

Related U.S. Application Data

(60) Provisional application No. 62/263,909, filed on Dec. 7, 2015.

(51) Int. Cl.
*A47K 3/28* (2006.01)
*A62C 31/00* (2006.01)
*F16L 37/00* (2006.01)

(52) U.S. Cl.
CPC ............... *A47K 3/28* (2013.01); *A47K 3/286* (2013.01); *A62C 31/00* (2013.01); *F16L 37/00* (2013.01)

(58) Field of Classification Search
CPC .................................................... A47K 3/286
USPC ............................................................ 4/900
See application file for complete search history.

(56) References Cited

U.S. PATENT DOCUMENTS

| | | | | |
|---|---|---|---|---|
| 2,923,480 A * | 2/1960 | Christian | ............... | A47K 3/286 122/18.31 |
| 3,010,116 A * | 11/1961 | Cowley | ................... | A47K 3/06 4/601 |
| 3,483,571 A * | 12/1969 | Cox, Jr. | ................ | A47K 3/285 4/616 |
| 3,651,523 A * | 3/1972 | Miyahara | ................. | A47K 3/28 4/615 |
| 3,939,503 A * | 2/1976 | Nazworth | .............. | A47K 3/286 239/146 |
| 4,084,270 A * | 4/1978 | Kersten, Jr. | ............ | A47K 3/286 239/135 |
| 4,340,981 A * | 7/1982 | Vanags | ................... | A61H 33/06 4/524 |
| 4,675,923 A * | 6/1987 | Ashley | ................... | A47K 3/286 4/596 |
| 5,111,538 A * | 5/1992 | Chapman | ............... | A47K 3/285 4/599 |
| 5,251,345 A * | 10/1993 | Pechner | ................ | A47K 3/325 4/603 |
| 5,265,288 A * | 11/1993 | Allison | .................. | A61H 35/02 4/620 |

(Continued)

*Primary Examiner* — Lori Baker
(74) *Attorney, Agent, or Firm* — Kevin Soules; Luis M. Ortiz; Kermit D. Lopez

(57) ABSTRACT

A first responder decontamination system, method, and apparatus comprising of a fluid supply in fluidic connection with a pipe further connected to a fluid dispenser, a valve for providing the fluid to the fluid dispenser from the fluid supply, a mounting bracket for adjustably mounting the fluid dispenser to a vehicle, and a pump configured to control pressure of the fluid supply. The fluid supply can be used to decontaminate first responders exiting a contaminated area.

18 Claims, 9 Drawing Sheets

(56) References Cited

U.S. PATENT DOCUMENTS

| | | | | |
|---|---|---|---|---|
| 5,375,275 A * | 12/1994 | Sanders | ............... | A47K 3/286 4/599 |
| 5,390,852 A * | 2/1995 | Schuenemann | ............ | A47C 1/14 239/263.1 |
| 5,544,369 A * | 8/1996 | Roberts | ............... | A47K 3/325 4/599 |
| 5,768,721 A * | 6/1998 | Kersten | ............... | A47K 3/286 4/596 |
| 5,852,836 A * | 12/1998 | Montrose | ............... | A47K 3/285 4/602 |
| 6,049,919 A * | 4/2000 | Roteman | ............... | A47K 3/285 4/602 |
| 6,978,496 B2 * | 12/2005 | Adrian | ............... | F24H 1/06 122/169 |
| 7,007,316 B2 * | 3/2006 | Lutz, II | ............ | G05D 23/1393 4/620 |
| 7,814,586 B1 * | 10/2010 | Samuels | ............... | A47K 3/288 4/612 |
| 8,337,751 B2 * | 12/2012 | Stewart | ............... | A47K 3/286 135/94 |
| 8,931,737 B2 * | 1/2015 | Savignac | ............... | B64D 11/02 244/118.5 |
| 9,021,626 B2 * | 5/2015 | Murden | ............... | B60R 15/02 4/603 |
| 9,179,806 B2 * | 11/2015 | Allos | ............... | B05B 1/24 |
| 2008/0179346 A1 * | 7/2008 | Downey | ............... | A23G 9/045 222/146.6 |
| 2008/0313801 A1 * | 12/2008 | Saxon | ............... | B63B 29/14 4/599 |
| 2010/0058532 A1 * | 3/2010 | Tsai | ............... | A47K 3/285 4/599 |
| 2012/0260417 A1 * | 10/2012 | LeBlanc | ............... | A47K 3/288 4/612 |

* cited by examiner

FIRST RESPONDER DECONTAMINATION SYSTEM

CROSS REFERENCE TO RELATED PATENT APPLICATIONS

This patent application claims the priority and benefit under 35 U.S.C. § 119(e) of U.S. Provisional Patent Application Ser. No. 62/263,909 filed Dec. 7, 2015, entitled "FIRST RESPONDER DECONTAMINATION SYSTEM." U.S. Provisional Patent Application Ser. No. 62/263,909 is herein incorporated by reference in its entirety.

TECHNICAL FIELD

The embodiments disclosed herein are generally related to decontamination methods and systems. The embodiments are also related to cancer prevention via decontamination of first responders. Embodiments are further related to deluge shower systems for removing contaminants in or at the location of an emergency response.

BACKGROUND

Unintended fires result in a tremendous number of byproducts in vapor gases and particulate matter suspension. These byproducts come from various components such as plastics, synthetics, and oil based derivatives. The byproducts attach themselves to everything they come in contact with, including first responders' personal protection equipment (PPE). Byproducts may cause harmful side effects when ingested or absorbed through dermal absorption.

The University of Cincinnati conducted a study titled "Firefighters Face Increased Risk for Certain Cancers" (2006) By Grace LeMasters, PhD, Ash Genaidy, PhD, and James Lockey, MD. The research was the largest comprehensive study to date investigating cancer risk associated with work as a firefighter. The results indicated that firefighters are at a significantly higher risk of developing four different types of cancer than workers in other fields. The researchers indicated, for example, that firefighters are twice as likely to develop testicular cancer and have significantly higher rates of non-Hodgkin's lymphoma and prostate cancer. The researchers also confirmed previous findings that firefighters are at greater risk for multiple myeloma. Researchers believe there is a direct correlation between the chemical exposure first responders experience on the job and their increased risk for cancer.

Furthermore, first responders are exposed to many compounds designated as carcinogens by the International Agency for Research on Cancer including benzene, diesel engine exhaust, chloroform, soot, styrene, and formaldehyde. These substances can be inhaled or absorbed through the skin and occur both at the scene of a fire and in the firehouse, where idling diesel fire trucks produce diesel exhaust. Epidemiologists found that half the studied cancers, including testicular, prostate, skin, brain, rectum, stomach and colon cancer, non-Hodgkin's lymphoma, multiple myeloma, and malignant melanoma were associated with firefighting to varying levels of increased risk.

Accordingly, there is a need for critical and immediate removal of contaminants from first responders and their protective equipment to help firefighters avoid inhalation and skin exposures to known and suspected occupational carcinogens.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the disclosed embodiments to provide a method and system for decontamination.

It is another aspect of the disclosed embodiments to provide a system for mobile decontamination of first responders.

It is yet another aspect of the disclosed embodiments to provide an enhanced method and system for providing a deluge shower attached to a first responder vehicle to decontaminate first responders, civilians, and first responders equipment as they exit a contamination zone.

The aforementioned aspects and other objectives and advantages can now be achieved as described herein. A first responder decontamination system comprises a fluid supply, a pipe connected to a fluid dispenser, a valve for providing the fluid to the fluid dispenser from the fluid supply, and a mounting bracket for adjustably mounting the fluid dispenser to a vehicle. In an embodiment, the vehicle comprises a first responder vehicle. In another embodiment, the fluid supply is associated with the first responder vehicle.

In an embodiment, a first responder decontamination apparatus comprises a fluid supply, a pipe connected to a fluid dispenser, a valve for providing the fluid to a fluid dispenser from the fluid supply, a mounting bracket for adjustably mounting the fluid dispenser to a vehicle, a pump configured to control pressure of the fluid supply, a cool pump configured to cool the fluid supply, and a heater configured to heat the fluid supply.

In an alternative embodiment, method for decontaminating first responders comprises providing, a fluid supply, connecting a pipe to a fluid dispenser, providing the fluid to the fluid dispenser from the fluid supply with a valve, adjustably mounting the fluid dispenser to a vehicle with a mounting bracket, and operating the valve upon a first responder exiting a contamination zone thereby showering the first responder with the fluid supply. The method comprises controlling the pressure of the fluid supply with a pump, selectively cooling the fluid supply with a cool pump, and selectively heating the fluid supply with a heater.

BRIEF DESCRIPTION OF THE FIGURES

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

Figure 1:
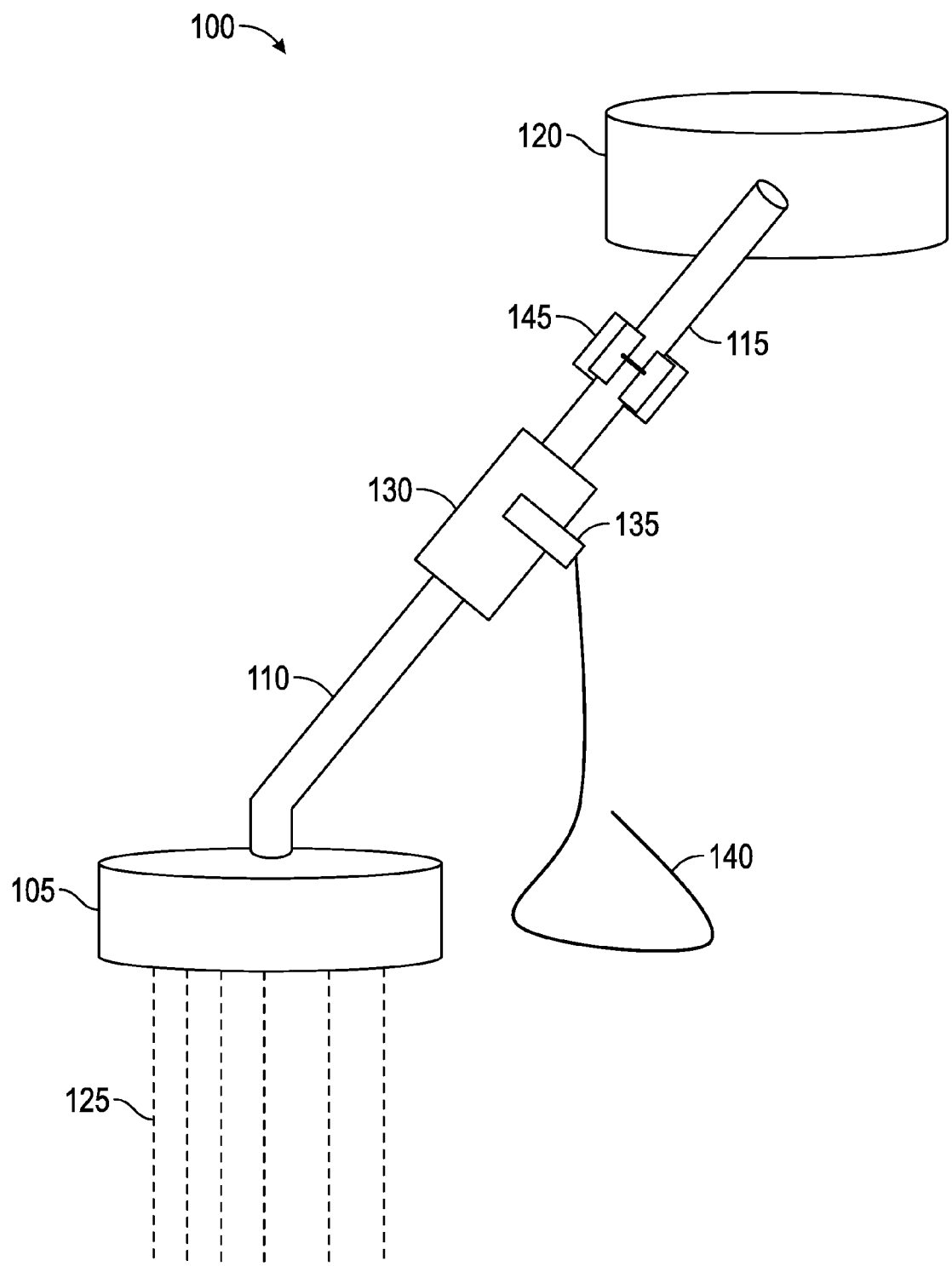
FIG. 1 depicts a block diagram of a decontamination system in accordance with the disclosed embodiments.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The embodiments disclosed herein provide methods and systems for first responders, in particular firefighters, to immediately and meticulously wash themselves and their equipment to remove soot and other residues from fires to avoid exposure to carcinogenic byproducts. The first responder decontamination system can be used prior to, or after, removal of protective equipment and can significantly reduce the likelihood of cross-contamination to the apparatus crew compartment and subsequently to the fire station. By changing the culture and creating a habit-forming protocol at the scene prior to removal of protective equipment, a significant reduction in cancer-causing agents can be expected.

In other embodiments, the first responder decontamination system can be deployed by a driver/operator of an attack suppression apparatus before the first responders such as, fire fighters, exit the burned structure or contaminated area. For fires or other hazardous materials incidents, a warm zone/chemical reduction zone can be established before entry is made into the hot/exclusionary zone. The systems and methods can be used for mass casualty decontamination of ambulatory personnel. In the event that there happens to be an emergency involving a first responder, an emergency decontamination wash station can be in place. At a structural fire, if an emergency is confirmed or if a victim is removed from that environment, a wash should be performed immediately according to the methods and systems disclosed herein.

FIG. 1 illustrates a first responder decontamination system 100 in accordance with an embodiment. The first responder decontamination system 100 can generally include a fluid dispensing end piece (showerhead) 105 connected via piping 110 and/or hoses 115 to a fluid supply 120. The showerhead 105 may preferably be a deluge shower device utilizing low pressure and high volume. Any water dispensing end piece may similarly be used. The fluid dispensing end piece 105 should be selected to dispense the necessary amount of fluid 125 to decontaminate a person or equipment subject to carcinogens or other such chemicals or contaminates at the location of an emergency response. While water may be the most common fluid available, other fluids including fire retarding fluids, cleaning fluids, or the like may alternatively or additionally be used with the system.

The showerhead 105 is connected to a fluid supply 120 via a set of hoses 115 and/or pipes 110. The fluid supply 120 may be a fire hydrant, an on-vehicle fluid supply, a natural water source such as a lake or pond, or other such fluid supply. Fluid flow to the showerhead 105 is regulated via a valve 130 and regulator 135 that can be operated using a valve handle 140. The valve 130 may have on and off positions and may also regulate the liquid flow rate via flow regulator 135, if so desired.

Figure 2A:
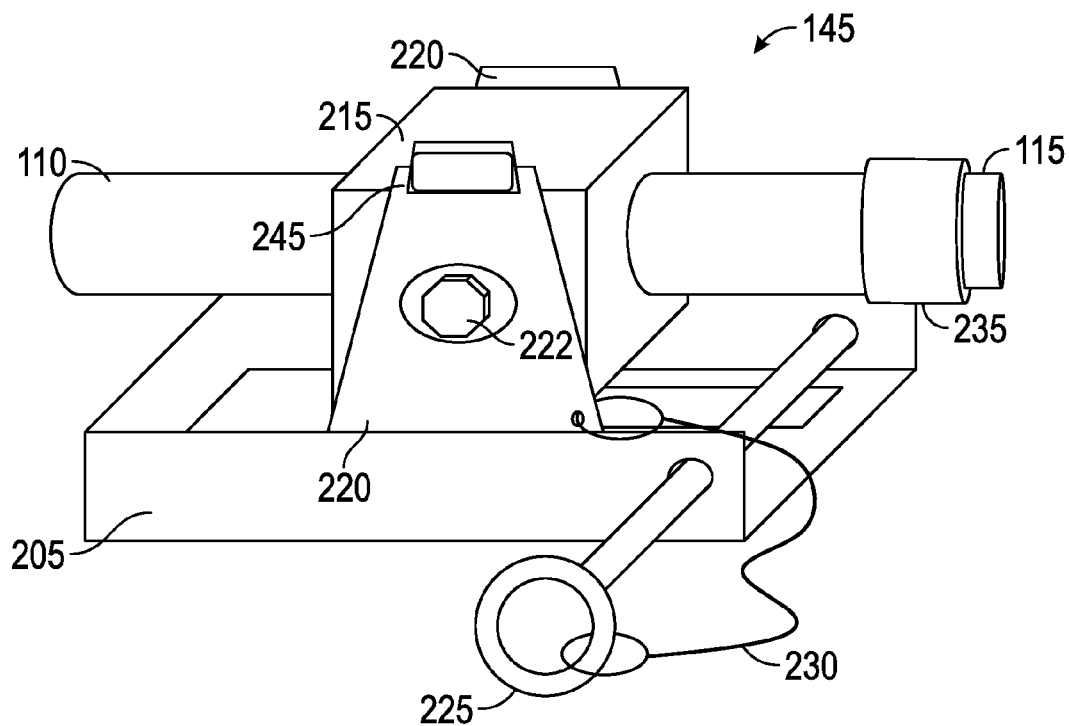
FIG. 2A depicts a mounting bracket assembly implemented in accordance with the disclosed embodiments.
Figure 2B:
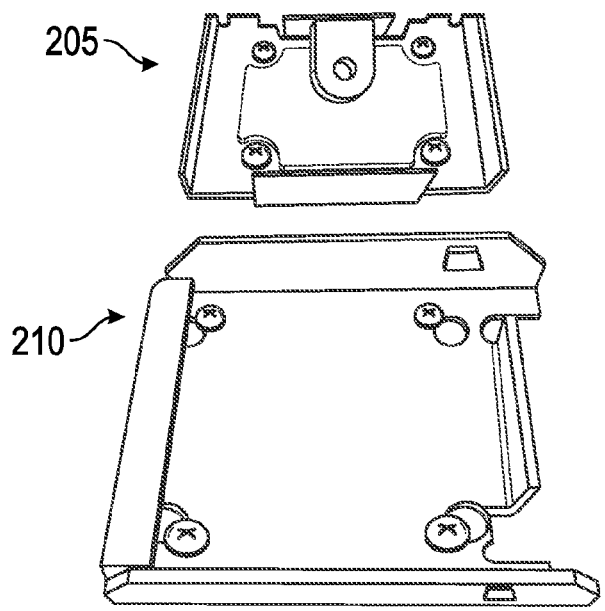
FIG. 2B depicts a mounting bracket and base assembly implemented in accordance with the disclosed embodiments.
Figure 5:
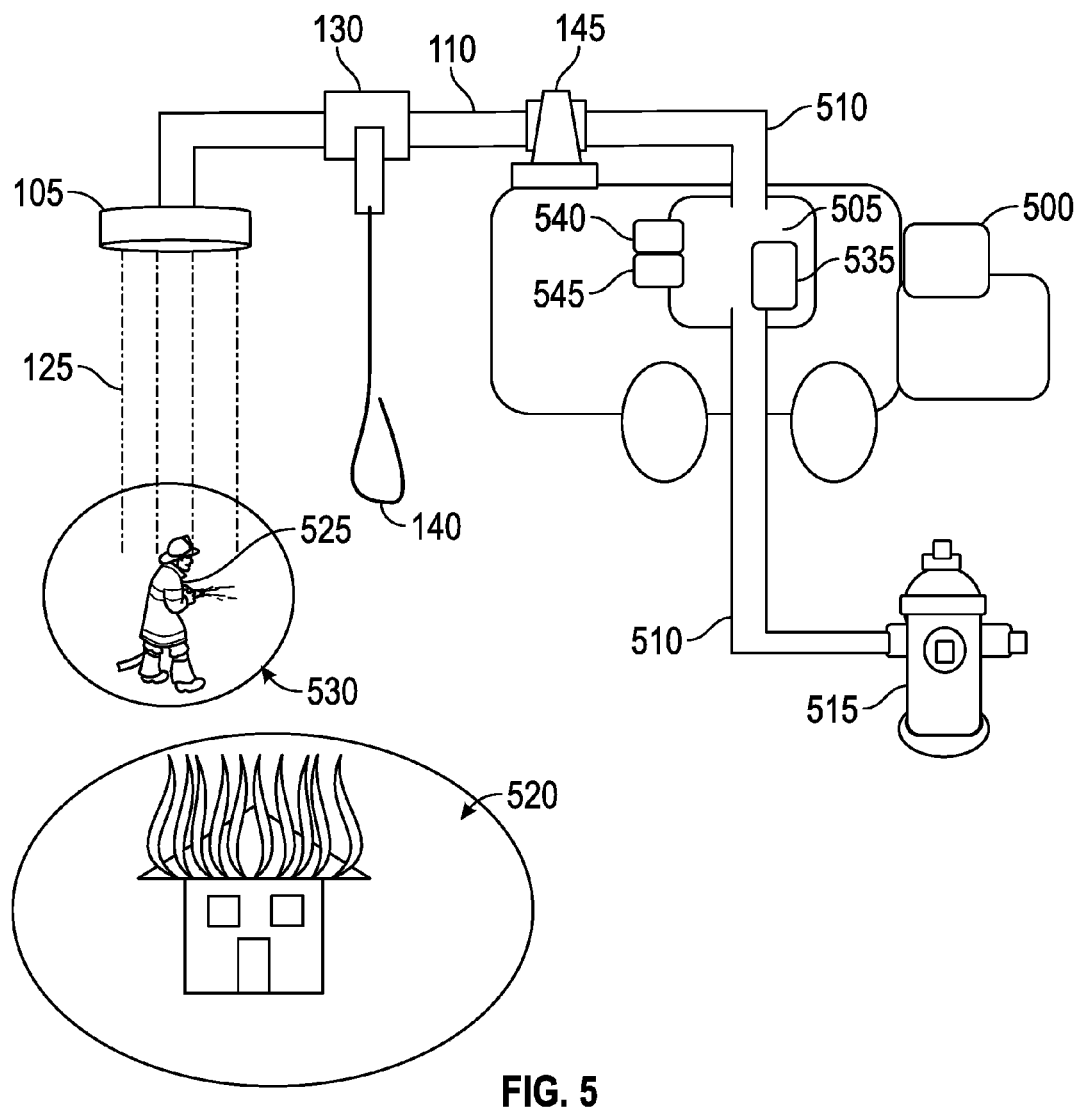
FIG. 5 depicts a mobile decontamination system deployed in a scene in accordance with the disclosed embodiments.

In many cases a first responder decontamination system 100 is adjustably mounted to a first responder vehicle such as a fire truck, ambulance, HAZMAT vehicle, rehab or rescue vehicle, or the like, as illustrated in FIG. 5, with a mounting bracket system 145. Mounting bracket system 145 includes a mounting bracket 205 that can be attached via bolts, screw, rivets, welding, or other such fastening means to such a vehicle via a base plate 210. Base plate 210 and mounting bracket 205 are illustrated in FIG. 2B. Alternatively, the mounting bracket system 145 may be used to mount the system 100 to any fixture or surface at or near the location of an emergency. This may include a vertical surface such as the side of a vehicle, a light pole, a sign or sign pole, the side of a building or structure, etc.

The mounting bracket 205 holds an adjustable mounting system that includes a mounting block 215 with a pipe shaped hole that is formed to allow pipe 110 to pass through the mounting block 215. The mounting block 215 can be held in place between two flanges 220 via screws, bolts 222, rivets, or other such connecting means. The adjustable mount allows the pipe 110 and showerhead 105 to be adjusted to a desired angle relative to the mounting bracket 205 via adjustment of the mounting block 215 between flanges 220.

A pin safety 225 can be inserted through the mounting bracket 205 in order to hold the adjustable mount at a desired angle and, prevent unwanted movement of the pipe 110 and showerhead 105. The pin safety 225 can be connected to the mounting bracket 205 via lanyard 230, wire, or other such device so that it cannot be displaced. In other embodiments, the mount may be configured to keep the pipe and showerhead level to the ground.

Figure 2C:
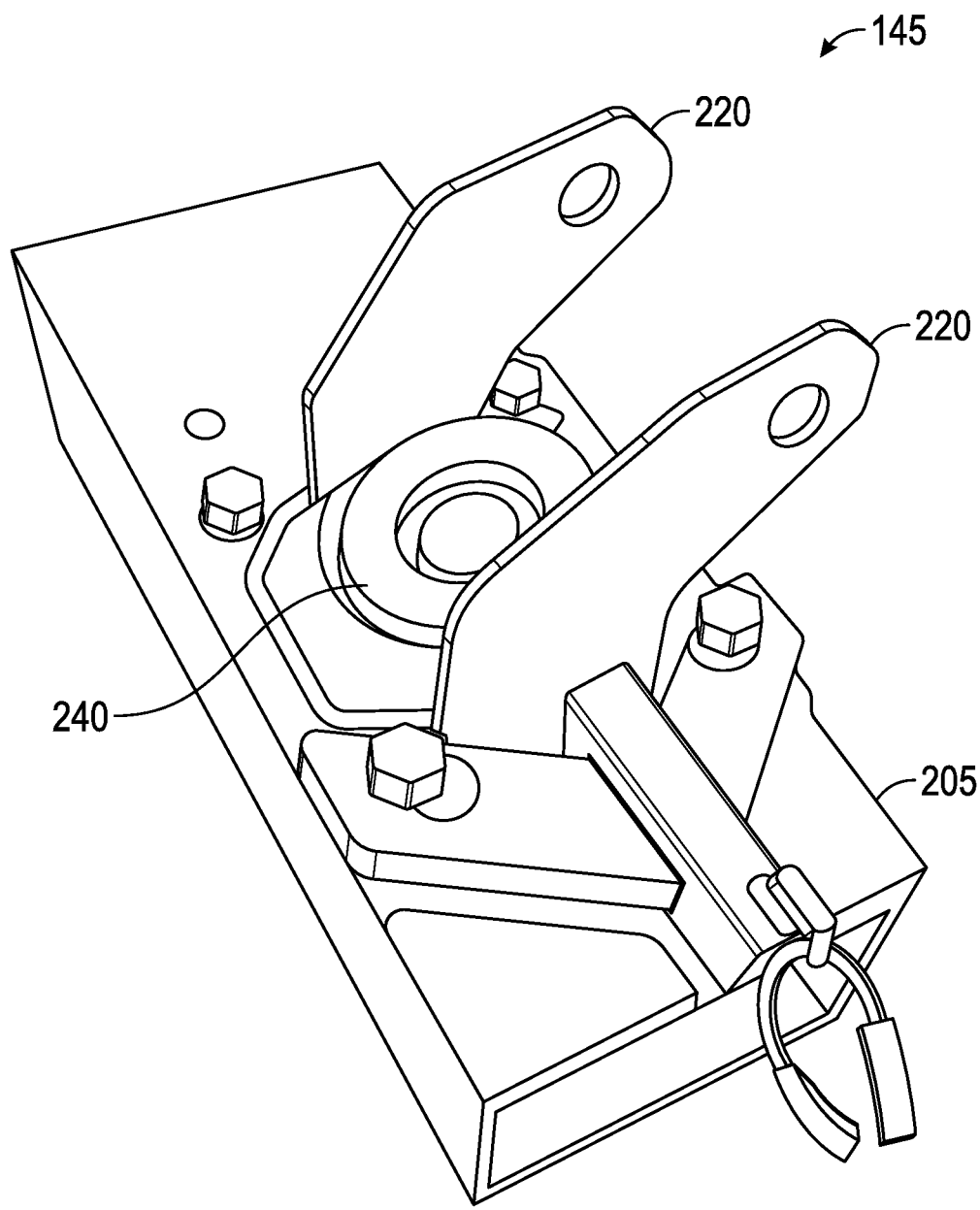
FIG. 2C depicts an alternative mounting bracket assembly implemented in accordance with the disclosed embodiments.

Numerous variations to the mounting bracket may be implemented in accordance with the embodiments disclosed herein. For example, in some embodiments, the mounting bracket may be fixed and in other cases the mounting bracket can be removable. In the embodiment illustrated in FIG. 2C, the mounting bracket system 145 can be embodied as a base 210 that accepts a rotating platform 240. Flanges 220 can be mounted to the rotating platform 240, thereby allowing the base mounting system to rotate in both the pitch and yaw directions, when a mounting block 215 is installed between the flanges 220.

Figure 2D:
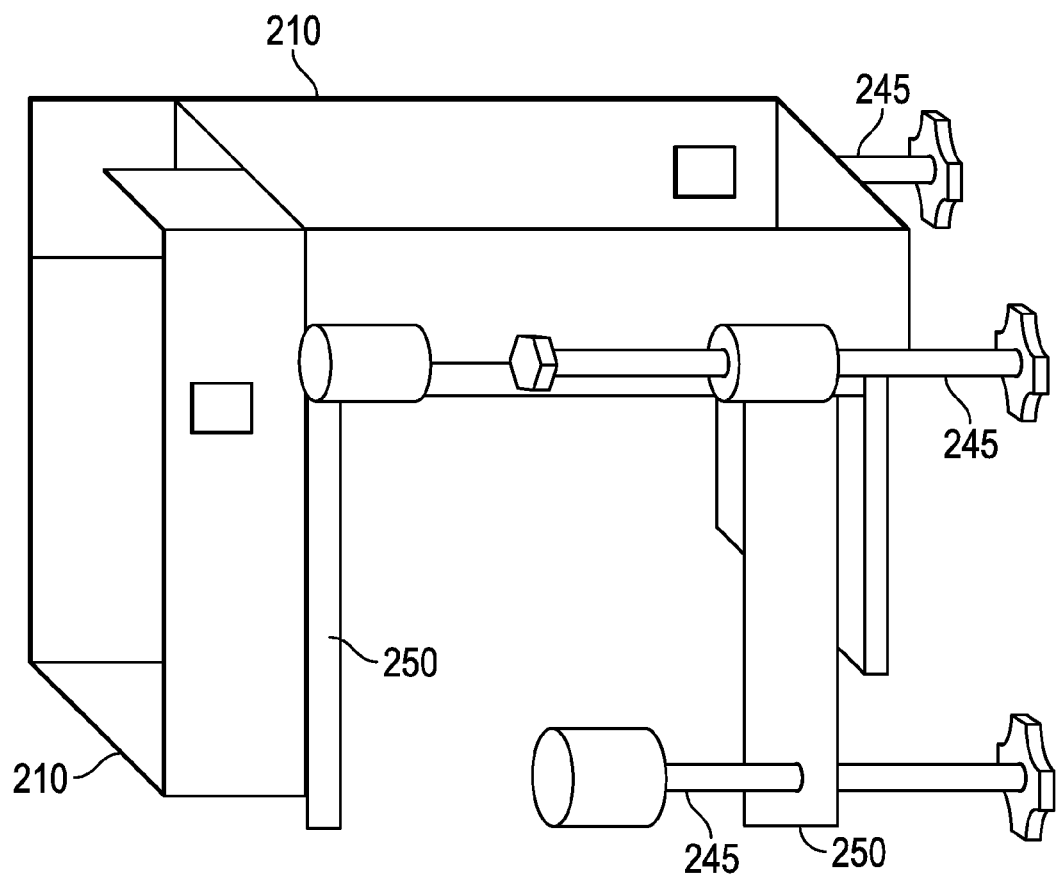
FIG. 2D depicts an alternative portable mounting bracket assembly implemented in accordance with the disclosed embodiments.

In another embodiment illustrated in FIG. 2D, the mounting bracket system can be embodied as a removable assembly. In this embodiment, a series of threaded mounting dowels 245 can be affixed to mounting base 210 with mounting plates 250. The mounting plates 250 can be placed over, for example, a door edge or other such structure and mounting dowels 245 can be screwed down to hold the mounting bracket system in place. After the mounting bracket system is in place, the remainder of the assembly can be installed inserting mounting bracket 205 and the associated mounting assembly into mounting base 210. This embodiment allows the system to be portable and mountable to fixtures present at the scene of deployment.

Figure 3:
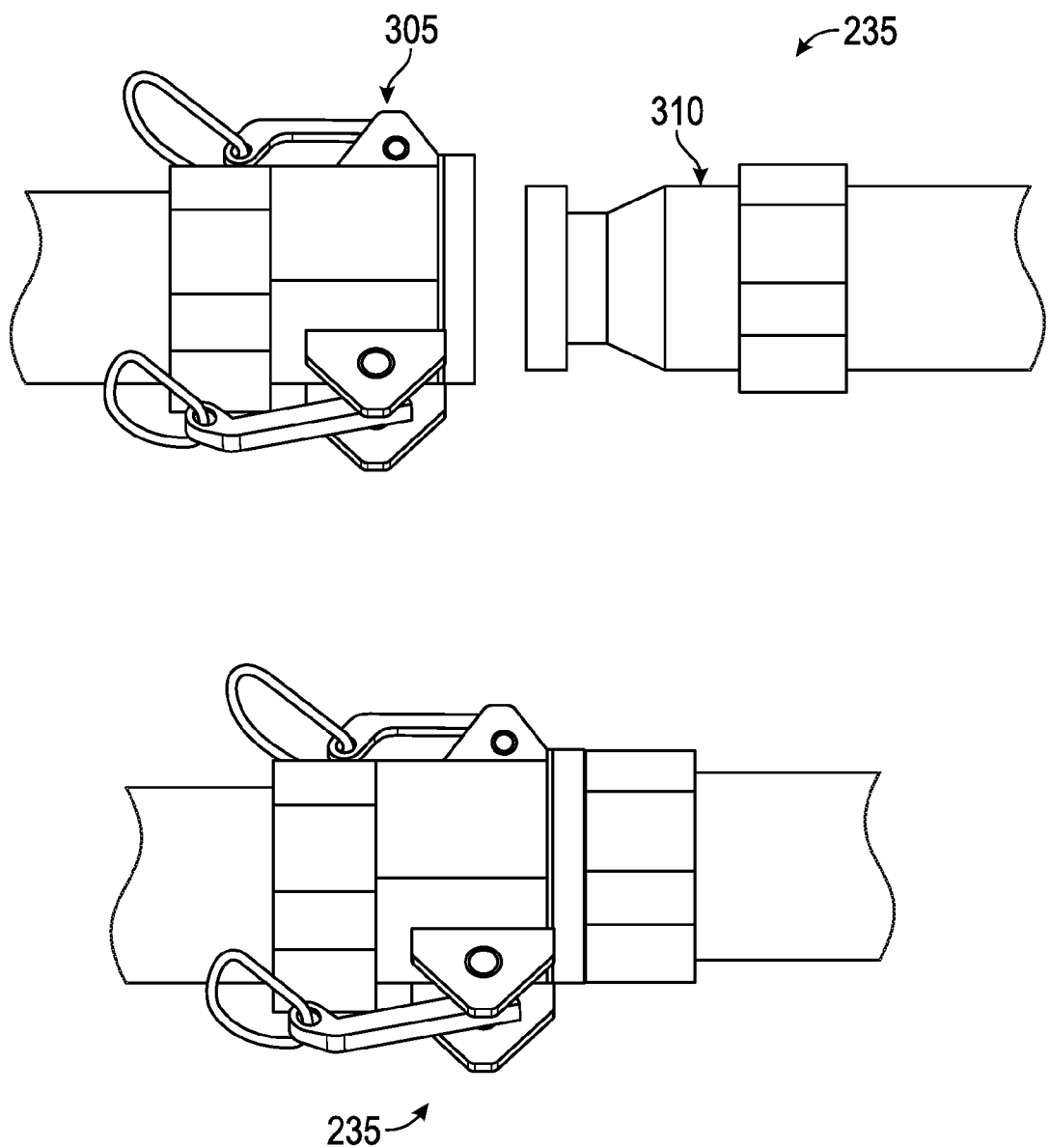
FIG. 3 depicts a pipe connection in accordance with the disclosed embodiments.

Connection fitting 235 may be used to connect pipe 110 to a second pipe or hose 115 in certain embodiments. Connection fitting 235 can be embodied as one or more fittings. For example, in some cases connection fitting 235 may be embodied as a female connection 310 connected to pipe 110, and male fitting 305 connected to pipe or hose 115 as illustrated in FIG. 3. The connection fitting 235 may comprise a compression fitting, threaded fitting, sealed fitting, or other such fitting depending on design considerations. In certain embodiments, the fitting may be selected to match the standard fittings used on or for water transmission on standard emergency response vehicles such as fire trucks.

Figure 4A:
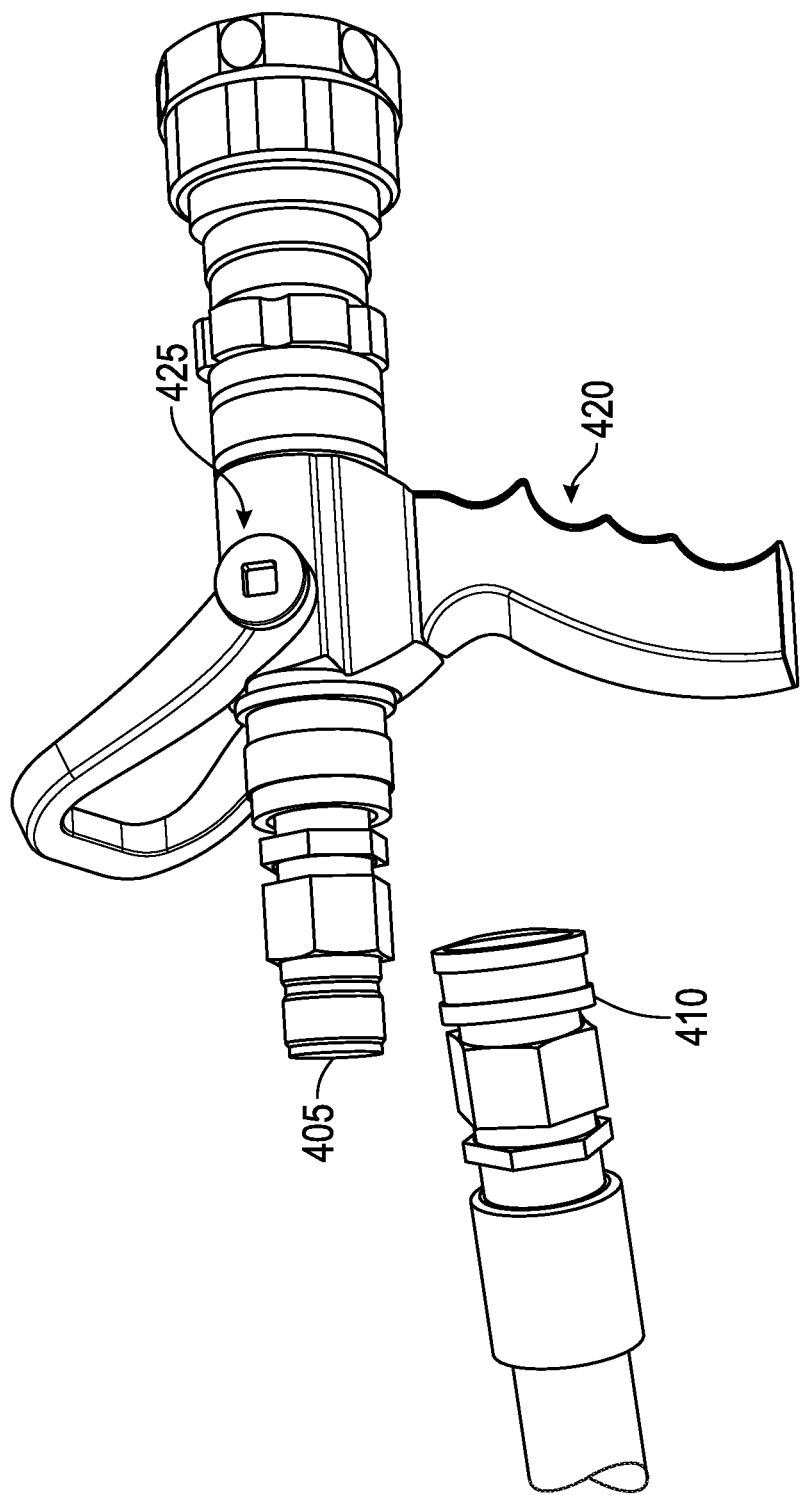
FIG. 4A depicts an alternative pipe connection in accordance with the disclosed embodiments.
Figure 4B:
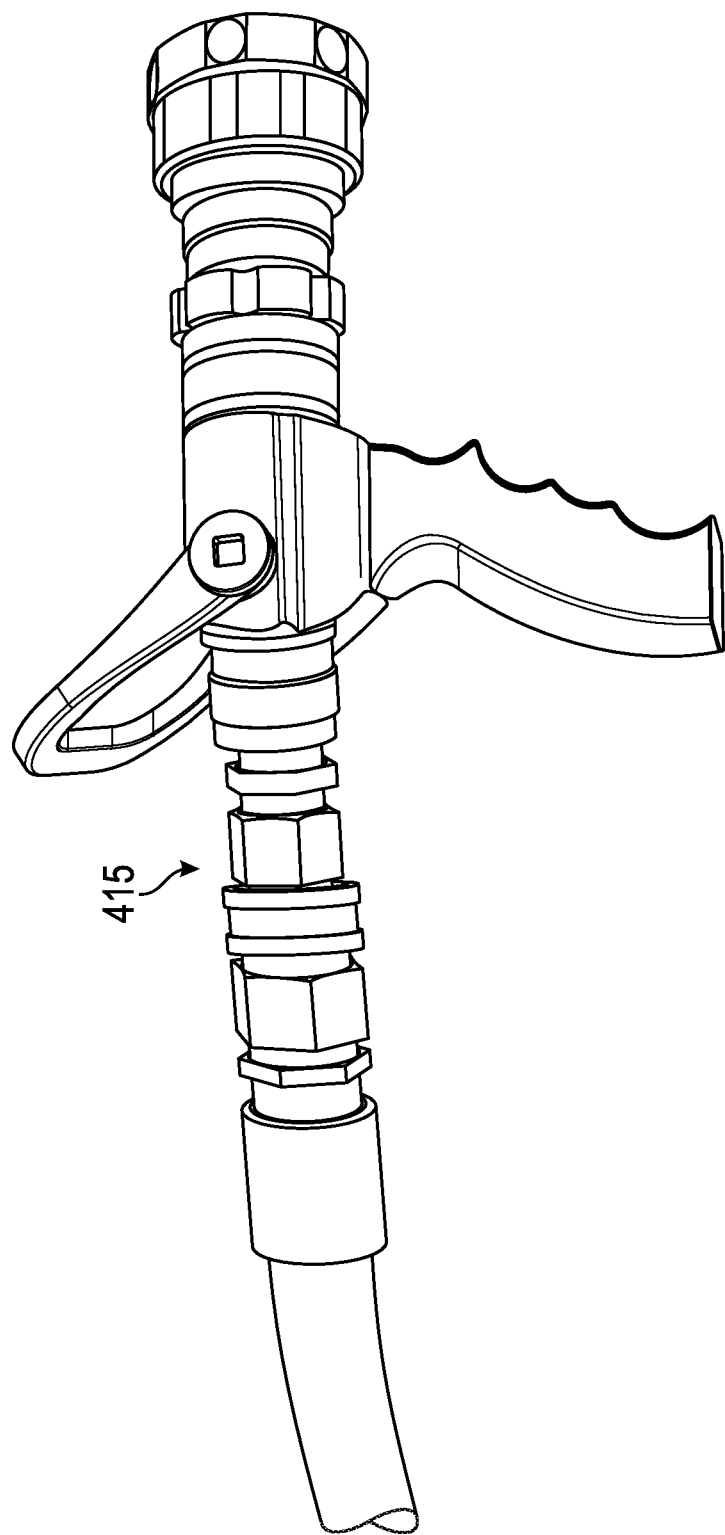
FIG. 4B depicts an alternative pipe connection in accordance with the disclosed embodiments.

FIG. 4A illustrates male connection fitting 405 and female connection fitting 410 for connecting, a hose 115 to the rigid, piping 110. The connection can be made using any number of connection means such as pressure fittings, threaded fittings, Quick Connect fittings, etc. FIG. 4A also illustrates a handle 420 connected to the rigid piping 110 and a valve connecting handle 425. The completed connection 415 is shown in FIG. 4B.

Although the system 100 may be installed anywhere in exemplary embodiments, the system is preferably mounted to an emergency response vehicle as illustrated in FIG. 5. However, in many cases first responder vehicles are large. The mounting bracket system 145 can be mounted anywhere on the vehicle, including a top surface of the vehicle. As such, the first responder system 100 may be inconveniently high above the ground. The valve handle 140 is preferably provided as a long handle that hangs from the valve 130. The distance from the handle 140 to the ground can be adjusted using the adjustable mounting bracket system 145 by tilting the piping 110 connected to the showerhead 105 using the adjustable mounting system 145. Thus, the valve handle 140 can be located at a height that is easy for first responders exiting a scene to reach. Preferably, pulling the valve handle 140 opens the valve 130 so that fluid is provided to the deluge showerhead 105. Similarly, pushing the valve handle 140 can turn the fluid flow off. The mounting bracket system 145 can include a fitting 245 to hold the valve handle so that the valve handle can be stored parallel with the pipe when not in use.

In FIG. 5, a first responder vehicle 500, embodied as a fire truck, is shown with a mounting bracket system 145 connected to a top surface of the vehicle 500. Rigid piping 110 is connected to the showerhead 105 so that the showerhead overhangs the edge of the vehicle 500.

The fluid source may be embodied as on-vehicle water 505 provided by a hose 510 to the rigid piping. Other cleaning agents may also be provided to the showerhead via piping or hoses connected to other tanks or sources. It should be understood that the on-board water source 505 may also be operatively connected to another water source such as a fire hydrant 515. In other embodiments, hose 510 may be connected directly to fire hydrant 515 or may be connected to another external water source.

The system can include an integrated pump 535 or a pump associated with the first responder vehicle such that the water system is pressure controlled. The liquid can be cooled with cool pump 540 so that it can be provided to cool down heat stressed first responders exiting a fire or other such environment. The liquid may also be warmed with heater 545 and can be provided to heat up first responders subject to cold weather operations In addition, the valve handle 140 is illustrated in the hanging position. The valve handle is connected to valve 130, such that pulling on valve handle 140 release fluid 125 via showerhead 105. In this case, the coloring of the valve handle 140 can be a bright color, such as yellow, so that it is easily identifiable by first responders 525 as they exit the contamination zone 520 and enter contamination free zone 530.

Figure 6:
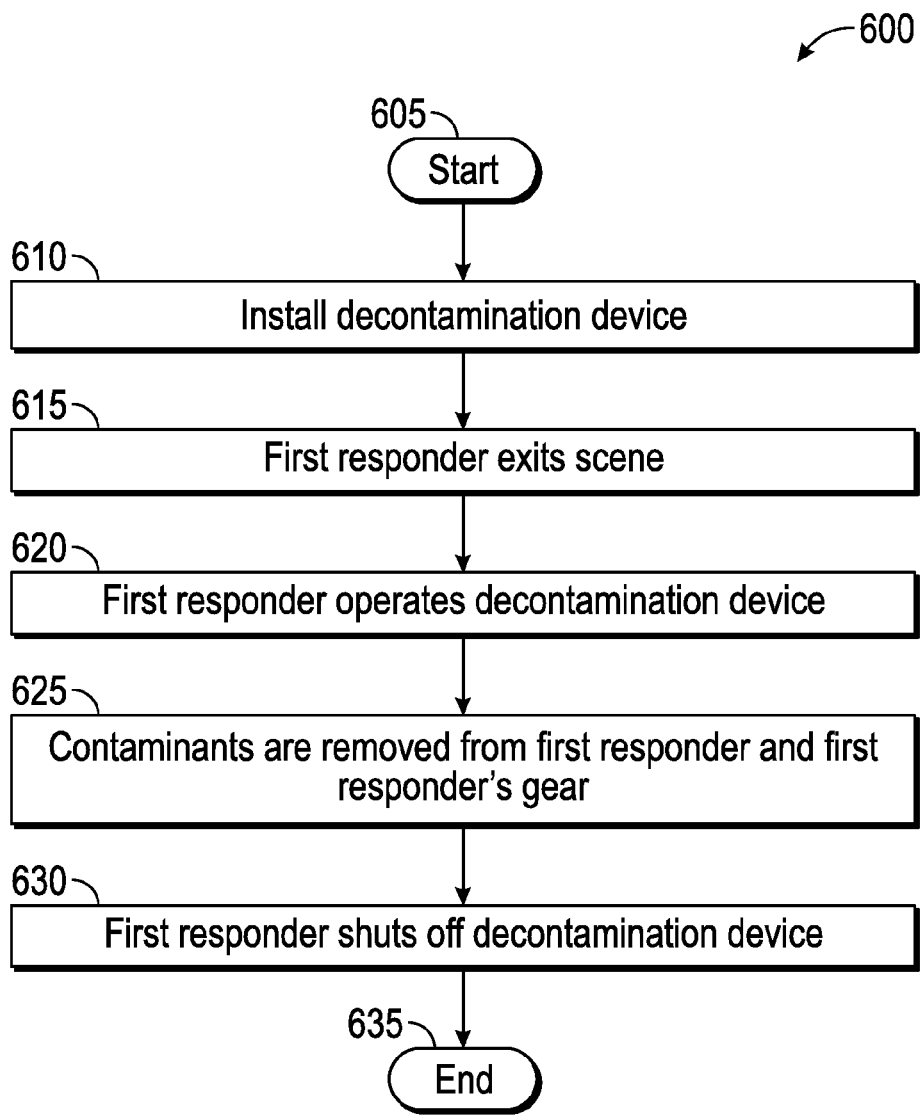
FIG. 6 depicts a flow chart illustrating steps associated with a method for decontamination in accordance with the disclosed embodiments.

In another embodiment, a method 600 for immediate removal of carcinogenic contaminates from first responders and their protective gear is illustrated in FIG. 6. The method begins at step 605.

Upon arrival at a fire, or other contaminated environment, a hose can be connected to any one of various water sources and/or other cleaning agents in one or more tanks. In some cases the water source may be a fire hydrant. In other cases, the water source may be associated with a vehicle, natural body of water, or other body of water. In still other embodiments, the system can include an integrated pump or a pump associated with the first responder vehicle such that the water system is pressure controlled. A decontamination device can be connected to one of the various fluid sources or hoses drawing water from the water sources. The device can thus be installed as illustrated at step 610.

During treatment of the fire, or other such emergency, the first responders and their protective gear are subjected to various carcinogenic contaminants. At step 615, the first responders exit the contaminated scene. In some cases, a contamination free zone may be organized for exiting first responders. Upon exiting the scene, a first responder can operate the decontamination device in order to provide liquid for removing the carcinogenic contaminants as shown at step 620. It should be appreciated that in one embodiment, the liquid may be water, but may also include other cleaning solvents or liquids and/or gases. It should further be appreciated that, if circumstances require, an operator, as opposed to the first responder, may be needed to initiate the flow of water for removing the carcinogenic contaminants.

In other embodiments, the liquid may be provided to cool down heat stressed first responders exiting a fire or other such environment. The liquid may also be warmed and can be provided to heat up first responders subject to cold weather operations.

Once the contaminants have been removed from the first responder and from the first responder's protective equipment, as shown at step 625, other first responder equipment including fire hoses, rescue gear bags, tanks, emergency lighting equipment, etc., may be subject to the liquid for decontamination before, demobilizing and storing the equipment. Finally, the liquid flow can be stopped as illustrated at step 630. The decontamination device is now ready for use with the next first responder and the method ends at step 635.

The first responder decontamination embodiments disclosed herein incorporate a deluge shower system that a single user can operate, affixed to a fire fighting apparatus that uses existing apparatus water line sources for first responder decontamination. A variety of available designs incorporate an on/off valve system that is connected to the apparatus using clamps, brackets, swivels, magnets, pins, adhesives, or any other mounting system for use as an overhead deluge shower that can be fixed or removable using a number of hose connection types for quick and easy connection to water discharge connections on the apparatus.

Application/implementation of the first responder decontamination system, after it is deployed and put into service, can be supplied by a fire-rated booster line or an Attack/Trash line. The water can come directly from the suppression apparatus storage tank and pressured by the apparatus pump. The first responder decontamination system can be affixed to any apparatus, most commonly a first responder vehicle. The first responder decontamination system can be deployed by a driver/operator of an attack suppression apparatus using any number of fixed mounting alternatives connected to any water discharge points on the apparatus. Further, the firefighter can decontaminate themselves using an on/off water valve control connection and any variety of pull handle valve operators.

During use, the first responder can walk beneath the first responder decontamination apparatus while still in their complete protective gear. The first responder can pull the operating handle to open the valve and rinse off the contamination particulate. They are then able to close the valve by themselves Although not required, in an alternative embodiment, a second person can operate the water valve for the first responder during decontamination.

Of particular note, the first responder decontamination system provides the ability to fix mount a deluge shower system to a fire apparatus. The embodiments allow for deployment to and use of the system in seconds with a quick connection fitting to the water supply line.

Based on the foregoing, it can be appreciated that a number of embodiments, preferred and alternative, are disclosed herein. For example, in one embodiment, a first responder decontamination system comprises a fluid supply, a pipe connected to a fluid dispenser, a valve for providing the fluid to the fluid dispenser from the fluid supply, and a mounting bracket for adjustably mounting the fluid dispenser to a vehicle. In an embodiment, the vehicle comprises a first responder vehicle. In another embodiment, the fluid supply is associated with the first responder vehicle.

In another embodiment, the fluid dispenser further comprises a deluge shower dispenser and the fluid supply comprises a fire hydrant.

In another embodiment, the mounting bracket further comprises a rotatable mounting block, and at least two flanges configured to hold the rotatable mounting block.

In another embodiment, the system further comprises a pump configured to controller pressure of the fluid supply, a cool pump configured to cool the fluid supply, and a heater configured to heat the fluid supply.

In yet another embodiment, a first responder decontamination apparatus comprises a fluid supply, a pipe connected to a fluid dispenser, a valve for providing the fluid to a fluid dispenser from the fluid supply, a mounting bracket for adjustably mounting the fluid dispenser to a vehicle, a pump configured to controller pressure of the fluid supply, a cool pump configured to cool the fluid supply, and a heater configured to heat the fluid supply.

In other embodiments, the vehicle comprises a first responder vehicle and the fluid supply is associated with the first responder vehicle. In another embodiment, the fluid dispenser further comprises a deluge shower dispenser. In an embodiment, the fluid supply comprises a fire hydrant.

In another embodiment of the apparatus, a mounting bracket further comprises a rotatable mounting block and at least two flanges configured to hold the rotatable mounting block.

In an alternative embodiment, a method for decontaminating first responders comprises providing a fluid supply, connecting a pipe to a fluid dispenser, providing the fluid to the fluid dispenser from the fluid supply with a valve, adjustably mounting the fluid dispenser to a vehicle with a mounting bracket, and operating the valve upon a first responder exiting a contamination zone thereby showering the first responder with the fluid supply.

In an embodiment of the method, the vehicle comprises a first responder vehicle and the fluid supply is associated with the first responder vehicle. In another embodiment of the method, the fluid dispenser further comprises a deluge shower dispenser. In an embodiment, the fluid supply comprises a fire hydrant.

Another embodiment of the method further comprises rotating the fluid dispenser to a desired height wherein the mounting bracket further comprises a rotatable mounting block and at least two flanges configured to hold the rotatable mounting block.

In yet another embodiment, the method comprises controlling the pressure of the fluid supply with a pump, selectively cooling the fluid supply with a cool pump, and selectively heating the fluid supply with a heater.

It will be appreciated that variations of the above-disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

What is claimed is:

1. A first responder decontamination system comprising:
   a fluid supply;
   a pipe connected to a fluid dispenser;
   a valve for providing said fluid to said fluid dispenser from said fluid supply; and
   a mounting bracket for adjustably mounting said fluid dispenser to a vehicle said mounting bracket comprising a rotatable mounting block, a stationary mounting bracket, and at least two flanges configured to hold said rotatable mounting block in said stationary mounting bracket.

2. The system of claim 1 wherein said vehicle comprises a first responder vehicle.

3. The system of claim 2 wherein said fluid supply is associated with said first responder vehicle.

4. The system of claim 1 wherein said fluid dispenser further comprises deluge shower dispenser.

5. The system of claim 1 wherein said fluid supply comprises a fire hydrant.

6. The system of claim 1 further comprising:
   a pump configured to controller pressure of said fluid supply;

a cool pump configured to cool said fluid supply; and
a heater configured to heat said fluid supply.

7. A first responder decontamination apparatus comprising:
- a fluid supply;
- a pipe connected to a fluid dispenser;
- a valve for providing said fluid to a fluid dispenser from said fluid supply;
- a mounting bracket for adjustably mounting said fluid dispenser to a vehicle;
- a pump configured to controller pressure of said fluid supply;
- a cool pump configured to cool said fluid supply; and
- a heater configured to heat said fluid supply.

8. The apparatus of claim 7 wherein said vehicle comprises a first responder vehicle.

9. The apparatus of claim 8 wherein said fluid supply is associated with said first responder vehicle.

10. The apparatus of claim 7 wherein said fluid dispenser further comprises a deluge shower dispenser.

11. The apparatus of claim 7 wherein said fluid supply comprises a fire hydrant.

12. The apparatus of claim 7 wherein said mounting bracket further comprises:
- a rotatable mounting block; and
- at least two flanges configured to hold said rotatable mounting block.

13. A method for decontaminating first responders said method comprising:
- providing a fluid supply;
- connecting a pipe to a fluid dispenser;
- providing said fluid to said fluid dispenser from said fluid supply with a valve;
- adjustably mounting said fluid dispenser to a vehicle with a mounting bracket;
- rotating said fluid dispenser to a desired height wherein said mounting bracket further comprises:
  - a rotatable mounting block; and
  - at least two flanges configured to hold said rotatable mounting block; and
- operating said valve upon a first responder exiting a contamination zone thereby showering said first responder with said fluid supply.

14. The method of claim 13 wherein said vehicle comprises first responder vehicle.

15. The method of claim 14 wherein said fluid supply is associated with said first responder vehicle.

16. The method of claim 13 wherein said fluid dispenser further comprises a deluge shower dispenser.

17. The method of claim 13 wherein said fluid supply comprises a fire hydrant.

18. The method of claim 13 further comprising:
- controlling said pressure of said fluid supply with a pump;
- selectively cooling said fluid supply with a cool pump; and
- selectively heating said fluid supply with a heater.

* * * * *